US008195927B2

(12) United States Patent
Kochar et al.

(10) Patent No.: US 8,195,927 B2
(45) Date of Patent: Jun. 5, 2012

(54) EXPEDIENT PREPARATION OF MEMORY FOR VIDEO EXECUTION

(75) Inventors: Sumeet Kochar, Apex, NC (US); William B. Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 11/932,849

(22) Filed: Oct. 31, 2007

(65) Prior Publication Data

US 2009/0113197 A1    Apr. 30, 2009

(51) Int. Cl.
G06F 9/00      (2006.01)
G06F 9/24      (2006.01)
G06F 15/177    (2006.01)
G06F 13/00     (2006.01)
G06F 12/02     (2006.01)
G09G 5/36      (2006.01)

(52) U.S. Cl. ............... 713/2; 713/1; 345/537; 345/543; 345/547

(58) Field of Classification Search ................ 713/1, 2, 713/100; 345/619, 641, 634
See application file for complete search history.

(56) References Cited

U.S. PATENT DOCUMENTS

| | | | |
|---|---|---|---|
| 5,654,758 A | | 8/1997 | Taylor et al. |
| 6,711,675 B1 * | | 3/2004 | Spiegel et al. ............ 713/2 |
| 6,791,572 B1 * | | 9/2004 | Cloney et al. ............. 345/619 |
| 6,963,344 B1 * | | 11/2005 | Kasprzak et al. ......... 345/543 |
| 7,213,152 B1 | | 5/2007 | Gafken et |
| 2002/0083369 A1 * | | 6/2002 | Schelling ................. 714/36 |
| 2003/0023812 A1 * | | 1/2003 | Nalawadi et al. ........ 711/118 |
| 2004/0181716 A1 * | | 9/2004 | Stern et al. ............... 714/718 |
| 2008/0244250 A1 * | | 10/2008 | Swanson et al. .......... 713/1 |

OTHER PUBLICATIONS

Magnor, Marcus, et al; Video-based Rendering; ACM Siggraph 2005.
Vickers, Brett J.; Source-Adaptive Multilayered Multicast Algorithms for Real-Time Video Distribution; IEEE/ACM Transactions on Networking, vol. 8, No. 6, Dec. 2000.
Anderson, David P.; Device Reservation in Audio/Video Editing Systems; ACM Transactions on Computer Systems, vol. 15, No. 2, May 1997, pp. 111-133.
Liu, Tiecheng, et al; Computational Approaches to Temporal Sampling of Video Sequences; ACM Transactions on Multimedia Computing, Communications and Applications, vol. 3, No. 2, Article 7, May 2007.

* cited by examiner

*Primary Examiner* — Kim Huynh
*Assistant Examiner* — Brandon Kinsey
(74) *Attorney, Agent, or Firm* — Steven M. Greenberg, Esq.; Carey, Rodriguez, Greenberg & O'Keefe

(57) ABSTRACT

A computer system that initializes a fraction of the computer system's memory for execution of video during booting of the computer system is provided. The computer system can include a first portion of BIOS code on a ROM device, wherein the first portion includes instructions for initializing the fraction. The computer system further can include a second portion of BIOS code that copies itself to the fraction upon completion of initialization of the fraction, wherein the second portion executes on the fraction and wherein the second portion initializes system memory and initializes a video buffer. The computer system further can include a copy of the second portion located on the ROM device, wherein the copy of the second portion executes until video buffer initialization is completed but before all of the system memory is initialized. Further, the video buffer displays video before all of the computer system's memory is initialized.

16 Claims, 3 Drawing Sheets

EXPEDIENT PREPARATION OF MEMORY FOR VIDEO EXECUTION

BACKGROUND OF THE INVENTION

1. Field of the Invention

The present invention relates to computer system memory, and more particularly to features for expediting the memory initialization process upon booting of a computer system.

2. Description of the Related Art

Power-on self-test (POST) is the common term for a computer system's pre-boot sequence. It is the first step of the more general process called booting. On power up, the main duties of POST are handled by the BIOS (Basic Input/Output System), which may hand some of these duties to other programs designed to initialize very specific peripheral devices, such as video initialization. These other duty-specific programs are generally known collectively as option ROMs, or in the case of video initialization, the video BIOS.

The primary function of the BIOS is to identify and initiate component hardware, such as hard drives. This is to prepare the machine so software programs can load, execute, and assume control of the PC. This process is known as booting. The BIOS runs from a Read Only Memory (ROM) device, such as flash memory, when the computer is powered on. It initializes several motherboard components and peripherals, including the chipset, the system memory, the primary graphics controller and the video buffer. A first portion of the BIOS code, entitled Phase 1 BIOS code, is executed from its location on the ROM device, wherein the processor is directed to the reset vector on the ROM device and all reads and writes operate on the ROM device. A reset vector refers to the default location a central processing unit will go to find the first instruction it will execute after a reset. The reset vector is a pointer or address indicating where the CPU will begin as soon as it is able to execute instructions.

Once a required amount of system memory (often 1 Megabyte of memory) is initialized, the BIOS typically copies and decompresses itself into that memory and continues executing from it. The BIOS code that executes after this copying step is referred to as Phase 2 BIOS code, wherein the processor is directed to the computer's RAM and all reads and writes operate on the RAM. Only after all of the system memory has been initialized, does the BIOS load the boot loader for the operating system and transfer control to it.

Checking system memory during POST involves a series of steps including, among other things, writing patterns to the memory, reading the patters to ensure data integrity, checking for errors, and then zeroing the memory. For small amounts of memory, these steps can be executed rather quickly. For large amounts of memory, however, these steps can take longer amounts of time, such as one second per gigabyte (GB). High end servers can have large amounts of memory available. In some cases, a server can have four memory cards with up to 8 Dual Inline Memory Modules (DIMMs) of 8 GB each, resulting in a total of up to 256 GB of RAM. Thus, at a rate of one GB per second, 256 GB of memory can take over 4 minutes to initialize, during which time many items, such as the video buffer, are not initiated. This results in a substantial period of time when the computer system's display is not showing any video or images, which can be disconcerting or confusing to a user of the computer.

One approach to this problem involves working with the vendor of the video processing chip to obtain a video BIOS that can run in a stack-less environment so as to initialize the video buffer during execution of the POST. The drawbacks to this approach include problems obtaining the proper cooperation from the vendor, as well as obtaining updated video BIOS for each future revision of the video processing chip. Another approach to this problem involves reverse engineering the video buffer initialization instructions and hard-coding the same instructions into the POST. This approach, however, is specific to a particular video processing chip, reducing is portability to other video processing chips. Further, this approach usurps a majority of Phase 1 BIOS code, which is limited in size.

Therefore, there is a need for improvements over the prior art, and more particularly, there is a need for a more efficient way of preparing memory during booting of a computer system so as to allow for quicker display of video.

BRIEF SUMMARY OF THE INVENTION

Embodiments of the present invention address deficiencies of the art in respect to memory initialization for computer systems with large amounts of memory. In one embodiment of the invention, a method for initializing a fraction of a computer system's memory for execution of video during booting of the computer system can be provided. The method can include executing a first portion of BIOS code for initializing the fraction of the computer system's memory, wherein the first portion of BIOS code is located on a ROM device. The method can further include copying, upon completion of initialization of the fraction, a second portion of BIOS code from the ROM device to the fraction. The method can further include executing the second portion of BIOS code on the fraction, wherein the second portion of BIOS code includes instructions for initializing all of the computer system's memory and for video buffer initialization. The method can further include executing the second portion of BIOS code on the ROM device until video buffer initialization is completed but before all of the computer system's memory is initialized. The method can further include displaying video from a video buffer that was initialized, wherein video is displayed before all of the computer system's memory is initialized.

In another embodiment of the present invention, a computer program product comprising a computer usable medium embodying computer usable program code for initializing a fraction of a computer system's memory for execution of video during booting of the computer system is provided. The computer program product includes computer usable program code comprising a first portion of BIOS code for initializing the fraction of the computer system's memory, wherein the first portion of BIOS code is located on a ROM device. The computer program product further includes computer usable program code for copying, upon completion of initialization of the fraction, a second portion of BIOS code from the ROM device to the fraction. The computer program product further includes computer usable program code for executing the second portion of BIOS code on the fraction, wherein the second portion of BIOS code includes instructions for initializing all of the computer system's memory and for video buffer initialization. The computer program product further includes computer usable program code for executing the second portion of BIOS code on the ROM device until video buffer initialization is completed but before all of the computer system's memory is initialized. The computer program product further includes computer usable program code for displaying video from a video buffer that was initialized, wherein video is displayed before all of the computer system's memory is initialized.

In yet another embodiment of the invention, a computer system that initializes a fraction of the computer system's memory for execution of video during booting of the computer system can be provided. The computer system can include a first portion of BIOS code located on a ROM device, wherein the first portion of BIOS code includes instructions for initializing the fraction of the computer system's memory. The computer system further can include a second portion of BIOS code that copies itself from the ROM device to the fraction upon completion of initialization of the fraction, wherein the second portion of BIOS code executes on the fraction, wherein the second portion of BIOS code includes instructions for initializing all of the computer system's memory and for video buffer initialization. The computer system further can include a copy of the second portion of BIOS code located on the ROM device, wherein the copy of the second portion of BIOS code executes until video buffer initialization is completed but before all of the computer system's memory is initialized. The computer system further can include a video buffer that was initialized, wherein the video buffer displays video before all of the computer system's memory is initialized.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for providing expedient initialization of a fraction of a computer's memory so as to allow execution of video during booting of a computer system. In accordance with an embodiment of the present invention, a computer system can include a first portion of BIOS code on a ROM device, wherein the first portion includes instructions for initializing the fraction. Upon completion of initialization of the fraction, a second portion of BIOS code copies itself to the fraction, wherein the second portion executes on the fraction and initializes system memory and a video buffer. A copy of the second portion located on the ROM device is subsequently executed until video buffer initialization is completed but before all of the system memory is initialized. The video buffer displays video before all of the computer system's memory is initialized.

Figure 1:
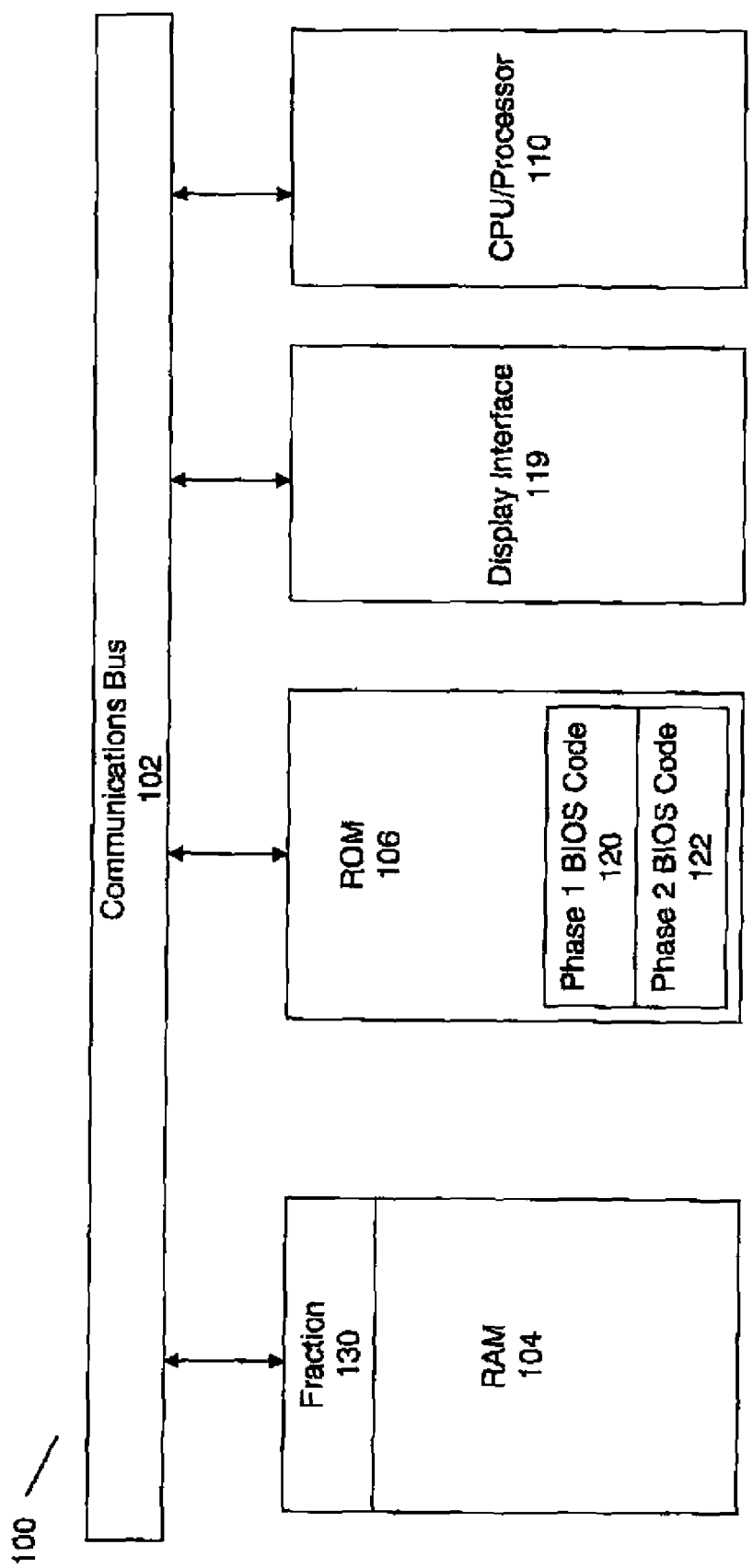
FIG. 1 is a block diagram illustrating the components of a computer system for implementing one embodiment of the present invention.

FIG. 1 is a block diagram illustrating the components of a computer system 100 for implementing one embodiment of the present invention. The computer system 100 of FIG. 1 includes one or more processors, such as Central Processing Unit (CPU)/processor 110. The processor 110 is connected to a communication infrastructure 102 (e.g., a communications bus, cross-over bar, or network). Note this is an exemplary computer system. After reading this description, it will become apparent to a person of ordinary skill in the relevant art(s) how to implement the invention using other computer systems and/or computer architectures.

The computer system 100 can include a display interface 119 that forwards graphics, text, and other data from the communication bus 102 (or from a frame buffer not shown) for display on a display unit, such as a Cathode Ray tube (CRT) monitor or a flat panel display. The computer system 100 also includes a main memory 104, preferably random access memory (RAM) that may, for example, comprise four memory cards with up to 8 DIMMs of 8 GB each. A fraction of the RAM 104 is indicated as the first megabyte of memory 130. A secondary memory (not shown) may include, for example, a hard disk drive and/or a removable storage drive, representing a floppy disk drive, a magnetic tape drive, an optical disk drive, etc.

The computer system 100 may also include a ROM 106 which may be one or more PROM chips, EPROM chips, EEPROM chips or flash memory modules. Flash memory is non-volatile computer memory that can be electrically erased and reprogrammed for general storage and transfer of data between computers and other devices. Flash memory is a specific type of EEPROM that is erased and programmed in large blocks.

ROM 106 includes source code or computer instructions that are executed ruing booting of the computer system 100. Specifically, ROM 106 includes a first portion of the BIOS code, entitled Phase 1 BIOS code 120, that, when executed, initializes the fraction 130 of the computer system's memory 104. ROM 106 also includes a second portion of the BIOS code, entitled Phase 2 BIOS code 122, that, when executed, continues initialization of the entire RAM 104 and further includes initialization of a video buffer.

Figure 2:
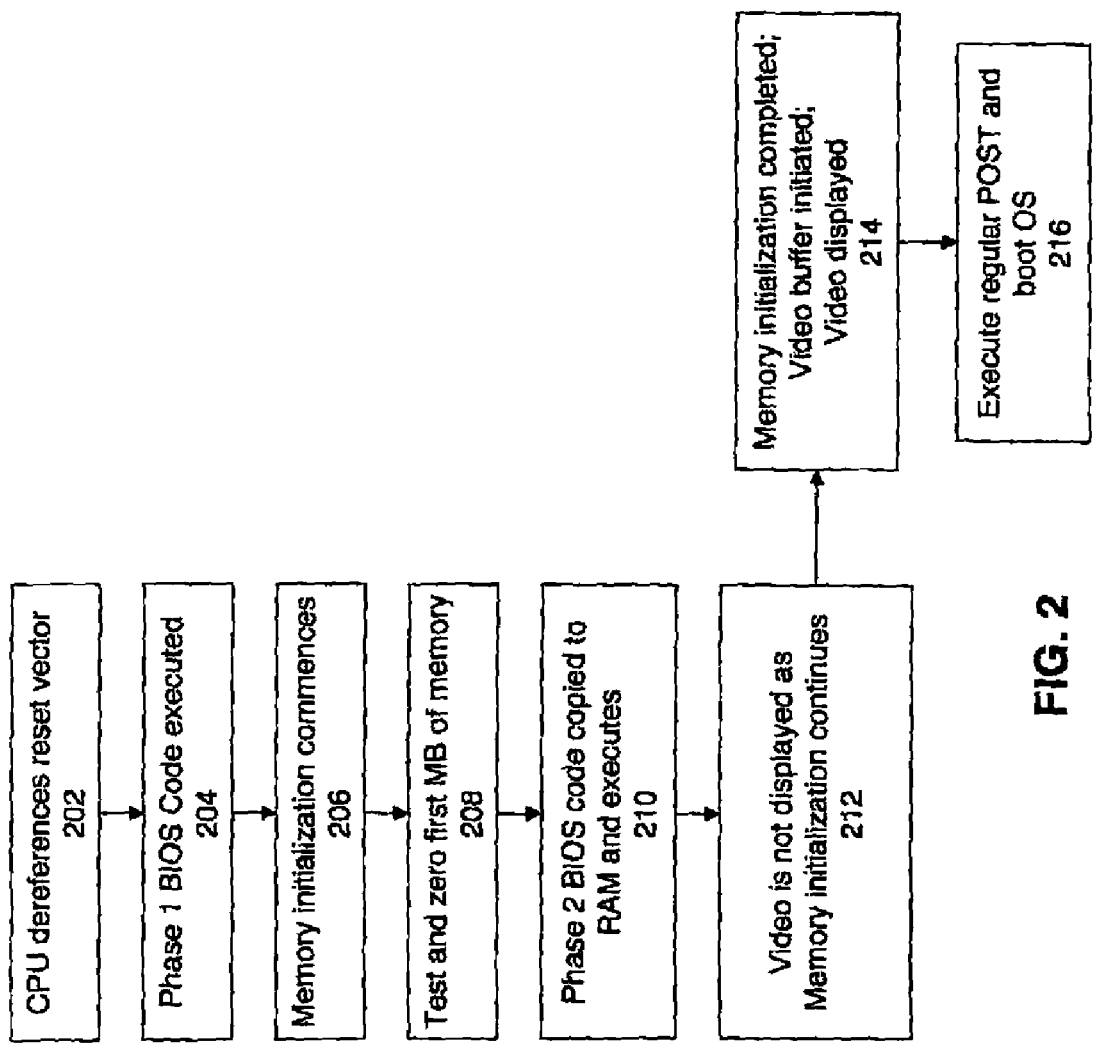
FIG. 2 is a flowchart showing the control flow of a conventional memory initialization process.

FIG. 2 is a flowchart showing the control flow of a conventional memory initialization process. FIG. 2 describes the steps that are performed during a conventional booting process of a computer system 100. In a first step 202, the CPU 110 dereferences the reset vector of the computer system 100. A reset vector refers to the default location the CPU 110 will go to find the first instruction it will execute after a reset. The reset vector is a pointer or address indicating where the CPU 110 will begin as soon as it is able to execute instructions. In this case, the reset vector points to the 0xF0000 segment on the ROM 106, which points to the Phase 1 BIOS Code 120.

In step 204, the Phase 1 BIOS Code is executed from its location on the ROM 106, wherein all reads and writes operate on the ROM device 106. Subsequently, the memory initialization process 206, which is described in the instructions 120, begins. Step 206 comprises bringing the chipset online. During this process, no read or write actions are performed on the RAM 104. Initializing memory involves a series of steps including writing patterns to the memory, reading the patters to ensure data integrity, checking for errors, and then zeroing the memory.

Next, a required amount of system memory 104 (such as one megabyte of memory 130) is initialized in step 208. Then, in step 210, the Phase 2 BIOS Code 122 copies and decompresses itself into the fraction 130 of memory 104 and continues executing from it. Phase 2 BIOS Code 122 includes video buffer initialization instructions. During execution of the copy of the Phase 2 BIOS Code on RAM 104, the processor 110 is directed to the fraction 130 on the RAM 104 and all reads and writes operate on the fraction 130 on the RAM 104. Further, BIOS interrupt services are installed.

Subsequently, in step 212, initialization of the memory 104 continues, during which time the video buffer in display interface 119 has not been initialized, and therefore video is not being displayed on the computer system's display.

In step 214, all of the system memory 104 has been initialized and the video buffer in display interface 119 has further been initialized, resulting in video being displayed on the computer system's display. In step 216, the copy of the Phase 2 BIOS Code on RAM 104 loads the boot loader for the operating system and transfers control to it.

Figure 3:
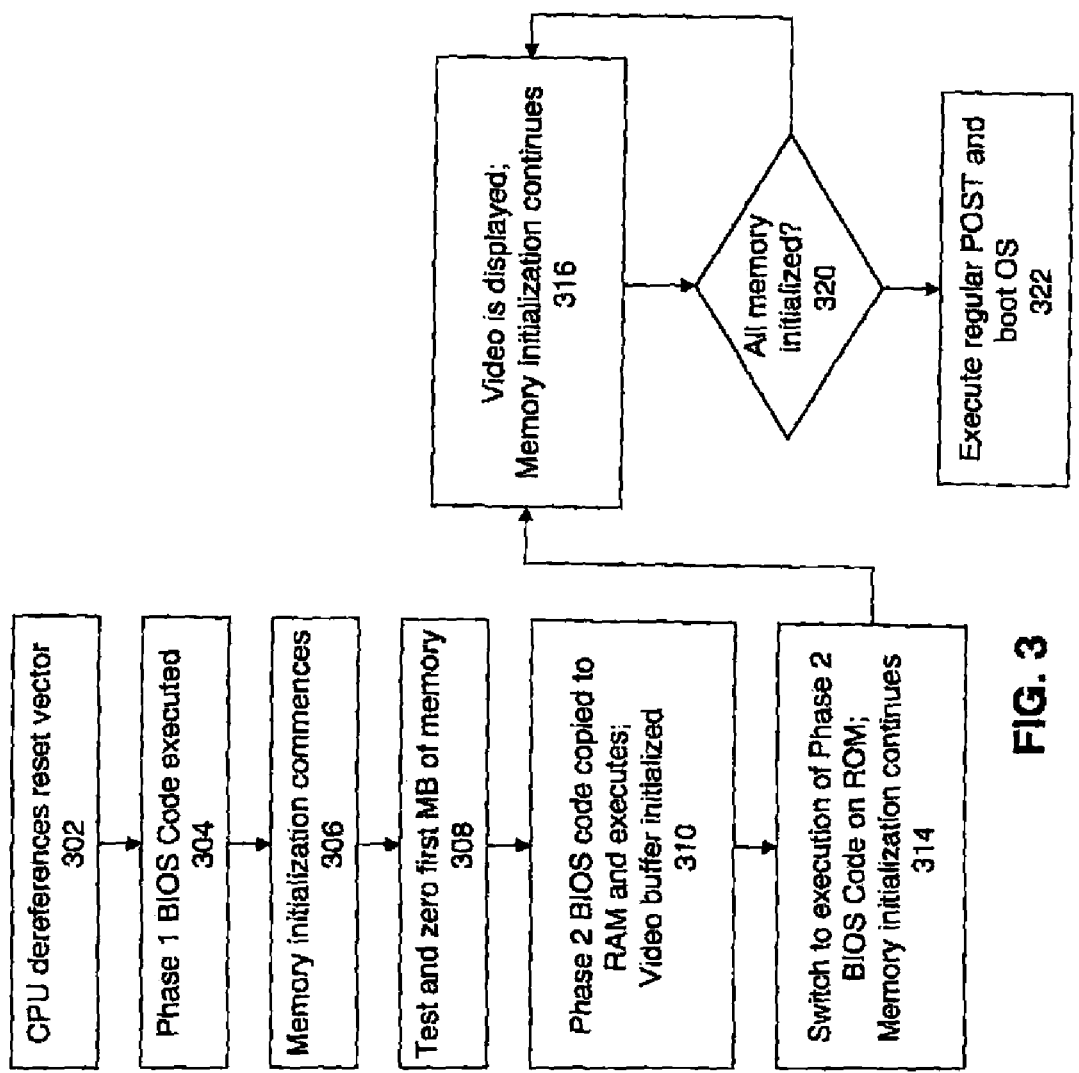
FIG. 3 is a flow chart depicting a memory initialization process that allows initialization of a video buffer before all memory has been initialized, according to one embodiment of the present invention.

FIG. 3 is a flow chart depicting a memory initialization process that allows initialization of a video buffer before all memory 104 has been initialized, according to one embodiment of the present invention. FIG. 3 describes the steps that are performed during the booting process of a computer system 100 so as to allow video to be executed during initialization of the memory 104. In a first step 302, the CPU 110 dereferences the reset vector of the computer system 100. In this case, the reset vector points to the 0xF0000 segment on the ROM 106, which points to the Phase 1 BIOS Code 120.

In step 304, the Phase 1 BIOS Code is executed from its location on the ROM 106, wherein all reads and writes operate on the ROM device 106. Subsequently, the memory initialization process 306, which is described in the instructions 120, begins. Step 306 comprises bringing the chipset online. During this process, no read or write actions are performed on the RAM 104. Next, a required amount of system memory 104 (such as one megabyte of memory 130) is initialized in step 308. Then, in step 310, the Phase 2 BIOS Code 122 copies and decompresses itself into the fraction 130 of memory 104 and continues executing from it. Phase 2 BIOS Code 122 includes video buffer initialization instructions.

During execution of the copy of Phase 2 BIOS Code on RAM 104, the processor 110 is directed to the fraction 130 on the RAM 104 and all reads and writes operate on the fraction 130 on the RAM 104. In step 310, initialization of the video buffer in display interface 119 is completed by the copy of Phase 2 BIOS Code on RAM 104. Further, BIOS interrupt services are installed.

In step 314, execution of the Phase 2 BIOS Code switches from the copy of Phase 2 BIOS Code on RAM 104 to the Phase 2 BIOS Code 122 on the ROM 106. This is accomplished by pointing the chipset to read from the same location as the reset vector—the 0xF0000 segment on the ROM 106. Further, all write operations originate from the Phase 2 BIOS Code 122 on the ROM 106.

Further in step 314, execution of the Phase 2 BIOS Code 122 on the ROM 106 jumps to execution of the memory initialization routines directed towards initializing all of the memory of RAM 104. Therefore, executing the Phase 2 BIOS Code 122 on the ROM 106 allows memory initialization of the remaining portions of RAM 104 to continue.

Since initialization of the video buffer in display interface 119 was completed in step 310 above, this allows video to be displayed on the display of the computer system 100 while memory initialization of the remaining portions of RAM 104 continues. At this juncture, the memory initialization routines, as well as other initialization routines, are free to read and write to any portion of the RAM 104, since the Phase 2 BIOS Code 122 is executing from the ROM 106.

In step 318, it is determined whether all of the system memory 104 has been initialized. If the result of this determination is positive, then control flows to step 322. In step 322, the Phase 2 BIOS Code 122 loads the boot loader for the operating system and transfers control to it. If the result of the determination of step 320 is negative, then control flows back to step 316 wherein video continues to be displayed on the display of the computer system 100 while memory initialization of the remaining portions of RAM 104 continues.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for initializing a fraction of a computer system's memory for execution of video during booting of the computer system, comprising:

executing a first portion of BIOS code for initializing the fraction of the computer system's memory, wherein the first portion of BIOS code is located on a ROM device;

copying, upon completion of initialization of the fraction, a second portion of BIOS code from the ROM device to the fraction;

executing the second portion of BIOS code on the fraction until completion of video buffer initialization, wherein the second portion of BIOS code includes instructions for initializing all of the computer system's memory and for video buffer initialization;

executing the second portion of BIOS code on the ROM device subsequent to completion of video buffer initialization; and displaying video from a video buffer that was initialized, wherein video is displayed before all of the computer system's memory is initialized.

2. The method of claim 1, wherein the step of executing the first portion of BIOS code comprises:
executing a first portion of BIOS code for initializing the fraction of the computer system's memory, wherein the first portion of BIOS code is located on a flash memory device.

3. The method of claim 2, wherein the step of executing the first portion of BIOS code further comprises:
executing a first portion of BIOS code for initializing one megabyte of the computer system's memory, wherein the first portion of BIOS code is located on a flash memory device.

4. The method of claim 3, wherein the step of copying comprises:
copying, upon completion of initialization of the megabyte, a second portion of BIOS code from the flash memory device to the megabyte.

5. The method of claim 4, wherein the step of executing the second portion of BIOS code on the fraction comprises:
executing the second portion of BIOS code on the megabyte, wherein the second portion of BIOS code includes instructions for initializing all of the computer system's memory and for video buffer initialization.

6. The method of claim 5, wherein the step of executing the second portion of BIOS code on the ROM device comprises:
executing the second portion of BIOS code on the flash memory device until video buffer initialization is completed but before all of the computer system's memory is initialized.

7. A computer program product comprising a non-transitory computer usable storage medium storing computer usable program code for initializing a fraction of a computer system's memory for execution of video during booting of the computer system, comprising:
computer usable program code comprising a first portion of BIOS code for initializing the fraction of the computer system's memory, wherein the first portion of BIOS code is located on a ROM device;
computer usable program code for copying, upon completion of initialization of the fraction, a second portion of BIOS code from the ROM device to the fraction;
computer usable program code for executing the second portion of BIOS code on the fraction until completion of video buffer initialization, wherein the second portion of BIOS code includes instructions for initializing all of the computer system's memory and for video buffer initialization;
computer usable program code for executing the second portion of BIOS code on the ROM device subsequent to completion of video buffer initialization; and,
computer usable program code for displaying video from a video buffer that was initialized, wherein video is displayed before all of the computer system's memory is initialized.

8. The computer program product of claim 7, wherein the computer usable program code comprising a first portion of BIOS code comprises:
computer usable program code comprising a first portion of BIOS code for initializing the fraction of the computer system's memory, wherein the first portion of BIOS code is located on a flash memory device.

9. The computer program product of claim 8, wherein the computer usable program code comprising a first portion of BIOS code further comprises:
computer usable program code comprising a first portion of BIOS code for initializing one megabyte of the computer system's memory, wherein the first portion of BIOS code is located on a flash memory device.

10. The computer program product of claim 9, wherein the computer usable program code for copying comprises:
computer usable program code for copying, upon completion of initialization of the megabyte, a second portion of BIOS code from the flash memory device to the megabyte.

11. The computer program product of claim 10, wherein the computer usable program code for executing the second portion of BIOS code on the fraction comprises:
executing the second portion of BIOS code on the megabyte, wherein the second portion of BIOS code includes instructions for initializing all of the computer system's memory and for video buffer initialization.

12. The computer program product of claim 11, wherein the computer usable program code for executing the second portion of BIOS code on the ROM device comprises:
computer usable program code for executing the second portion of BIOS code on the flash memory device until video buffer initialization is completed but before all of the computer system's memory is initialized.

13. A computer system that initializes a fraction of the computer system's memory for execution of video during booting of the computer system, comprising:
a first portion of BIOS code located on a ROM device, wherein the first portion of BIOS code includes instructions for initializing the fraction of the computer system's memory;
a second portion of BIOS code that copies itself from the ROM device to the fraction upon completion of initialization of the fraction, wherein the second portion of BIOS code executes on the fraction until completion of video buffer initialization, wherein the second portion of BIOS code includes instructions for initializing all of the computer system's memory and for video buffer initialization;
a copy of the second portion of BIOS code located on the ROM device, wherein the copy of the second portion of BIOS code executes before all of the computer system's memory is initialized subsequent to completion of video buffer initialization; and
a video buffer that was initialized, wherein the video buffer displays video before all of the computer system's memory is initialized.

14. The computer system of claim 13, wherein the ROM device comprises a flash memory device.

15. The computer system of claim 14, wherein the fraction of the computer system's memory comprises one megabyte of memory.

16. The computer system of claim 13, further comprising a display for displaying video from the video buffer.

* * * * *